United States Patent
Baughman et al.

(10) Patent No.: US 10,764,656 B2
(45) Date of Patent: Sep. 1, 2020

(54) AGGLOMERATED VIDEO HIGHLIGHTS WITH CUSTOM SPECKLING

(71) Applicant: INTERNATIONAL BUSINESS MACHINES CORPORATION, Armonk, NY (US)

(72) Inventors: Aaron K. Baughman, Cary, NC (US); Mauro Marzorati, Lutz, FL (US); Gray Cannon, Miami, FL (US); Craig M. Trim, Ventura, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/240,319

(22) Filed: Jan. 4, 2019

(65) Prior Publication Data

US 2020/0221191 A1    Jul. 9, 2020

(51) Int. Cl.
*H04N 21/8549* (2011.01)
*G11B 27/034* (2006.01)
(Continued)

(52) U.S. Cl.
CPC ....... *H04N 21/8549* (2013.01); *G06F 16/483* (2019.01); *G06F 16/487* (2019.01);
(Continued)

(58) Field of Classification Search
CPC .............. H04N 21/8549; H04N 27/034; G06F 16/7834; G06F 16/487; G06F 16/483; G06G 16/786
See application file for complete search history.

(56) References Cited

U.S. PATENT DOCUMENTS

| 9,826,277 B2 | 11/2017 | Wang et al. |
| 2003/0133511 A1* | 7/2003 | Cabasson ........... G06K 9/00744 375/240.26 |

(Continued)

FOREIGN PATENT DOCUMENTS

| AU | 2016201929 A1 | 10/2017 |
| DE | 69629655 T2 | 6/2004 |
| JP | 6018653 B2 | 11/2016 |

OTHER PUBLICATIONS

Anonymous, "Method and System for Sensor and Controller Synchronization in Cognitive IoT Game Platforms", IP.com No. IPCOM000247290D, Aug. 19, 2016, 6 pgs.
(Continued)

*Primary Examiner* — David E Harvey
(74) *Attorney, Agent, or Firm* — Brian Restauro, Esq.; George S. Blasiak, Esq.; Heslin Rothenberg Farley & Mesiti P.C.

(57) ABSTRACT

Presentation of video highlights is disclosed. A data processing system receives from multiple users, multimedia files with user-generated video(s), the multimedia files being produced and enhanced by the users. The data processing system generates a speckle excitement vector of the multimedia files based on identifying feature(s) of the user-generated video(s). The processing and distribution system determines a cognitive state of each of the users based, in part, on the speckle excitement vector of each of the multimedia files. The processing and distribution system alters characteristic(s) of the user-generated video(s) of the multimedia files based on the cognitive state of each of the users that results in altered video(s). The processing and distribution system compiles the altered video(s) into a digital file that includes automatically-produced multimedia
(Continued)

content. The processing and distribution system makes the digital file available for viewing.

20 Claims, 9 Drawing Sheets

(51) Int. Cl.
 *G06F 16/783* (2019.01)
 *G06F 16/487* (2019.01)
 *G06F 16/483* (2019.01)
(52) U.S. Cl.
 CPC ........ *G06F 16/786* (2019.01); *G06F 16/7834* (2019.01); *G11B 27/034* (2013.01)

(56) References Cited

U.S. PATENT DOCUMENTS

| | | | |
|---|---|---|---|
| 2010/0194988 A1* | 8/2010 | Takaoka | G06K 9/00711 348/578 |
| 2015/0147045 A1 | 5/2015 | Birnkrant | |
| 2015/0318020 A1* | 11/2015 | Pribula | H04N 21/43615 386/227 |
| 2016/0337718 A1* | 11/2016 | Talbott | H04N 21/8547 |
| 2018/0150456 A1 | 5/2018 | Kozloski et al. | |
| 2018/0365570 A1* | 12/2018 | Koukoumidis | G06N 5/04 |
| 2019/0244639 A1* | 8/2019 | Benedetto | G11B 27/10 |
| 2019/0258673 A1* | 8/2019 | Fridental | G06F 16/211 |

OTHER PUBLICATIONS

Chen, S.C., et al., "Detection of soccer goal shots using joint multimedia features and classification rules", MDM/KDD '03, Aug. 27, 2003, 10 pgs.

Mell, Peter, et al., "The NIST Definition of Cloud Computing", NIST Special Publication 800-145, Sep. 2011, Gaithersburg, MD, 7 pgs.

* cited by examiner

AGGLOMERATED VIDEO HIGHLIGHTS WITH CUSTOM SPECKLING

BACKGROUND

It is common for attendees of public events such as sports events, concerts, and festivals to take videos of their experience using their personal devices and publicly share those videos via social media platforms. Video content that is recorded by attendees is compelling because it captures the attendees' unique, first-hand perspective of the event. Further, it is likely that attendees will capture exciting moments that are missed by an event's official content producers and unavailable on official digital channels.

Currently for someone to view exciting video content recorded by multiple attendees, the viewer must curate through a large volume of recorded video content that multiple attendees have uploaded and shared on the Internet and/or social media platforms. The volume of recorded video content available on the Internet and/or social media platforms presents a challenge as it is difficult to find content of interest to the viewer. Curating recorded video content via manual splicing or other existing methods is time-intensive, which is particularly inconvenient at a live event where immediacy is important to audience members interested in viewing video of the event recorded by multiple attendees.

SUMMARY

Shortcomings of the prior art are overcome and additional advantages are provided through the provision, in one aspect, of a computer-implemented method of presenting video highlights. The computer-implemented method comprises receiving, by a processing and distribution system, from at least two users, at least two multimedia files each comprising at least one user-generated video, and where the at least two multimedia files are produced and enhanced by the at least two users. The computer-implemented method also comprises generating, by the processing and distribution system, a speckle excitement vector of each of the at least two multimedia files based on at least one identifying feature of the at least one user-generated video. The computer-implemented method also comprises determining, by the processing and distribution system, a cognitive state of each of the at least two users based, in part, on the speckle excitement vector of each of the at least two multimedia files. The computer-implemented method also comprises altering, by the processing and distribution system, one or more characteristic of the at least one user-generated video of each of the at least two multimedia files based on the cognitive state of the at least two users, resulting in one or more altered video. The computer-implemented method also comprises compiling, by the processing and distribution system, the one or more altered video into a digital file comprising automatically-produced multimedia content. The computer-implemented method also comprises making, by the processing and distribution system, the digital file available for viewing. This computer-implemented method of presenting video highlights provides an advantage over existing methods because it provides a faster and more efficient way of viewing video content recorded by multiple attendees that would be of interest to a viewer.

In another aspect, a system for presenting video highlights may be provided. The system may include, for example, memory(ies), and at least one processor in communication with the memory(ies). The memory(ies) include program instructions executable by the one or more processor to perform a method. The method may include, for example, a computer-implemented method of presenting video highlights comprising receiving, by a processing and distribution system, from at least two users, at least two multimedia files each comprising at least one user-generated video, and where the at least two multimedia files are produced and enhanced by the at least two users. The computer-implemented method also comprises generating, by the processing and distribution system, a speckle excitement vector of each of the at least two multimedia files based on at least one identifying feature of the at least one user-venerated video. The computer-implemented method also comprises determining, by the processing and distribution system, a cognitive state of each of the at least two users based, in part, on the speckle excitement vector of each of the at least two multimedia files. The computer-implemented method also comprises altering, by the processing and distribution system, one or more characteristic of the at least one user-generated video of each of the at least two multimedia files based on the cognitive state of the at least two users, resulting in one or more altered video. The computer-implemented method also comprises compiling, by the processing and distribution system, the one or more altered video into a digital file comprising automatically-produced multimedia content. The computer-implemented method also comprises making, by the processing and distribution system, the digital file available for viewing. This system for presenting video highlights provides an advantage over existing systems because it provides a faster and more efficient way of viewing video content recorded by multiple attendees that would be of interest to a viewer.

In a further aspect, a computer program product may be provided. The computer program product may include a storage medium readable by a processor and storing instructions executable by the processor for performing a method. The method may include, for example, a computer-implemented method of presenting video highlights comprising receiving, by a processing and distribution system, from at least two users, at least two multimedia files each comprising at least one user-generated video, and where the at least two multimedia files are produced and enhanced by the at least two users. The computer-implemented method also comprises generating, by the processing and distribution system, a speckle excitement vector of each of the at least two multimedia files based on at least one identifying feature of the at least one user-generated video. The computer-implemented method also comprises determining, by the processing and distribution system, a cognitive state of each of the at least two users based, in part, on the speckle excitement vector of each of the at least two multimedia files. The computer-implemented method also comprises altering, by the processing and distribution system, one or more characteristic of the at least one user-generated video of each of the at least two multimedia files based on the cognitive state of the at least two users, resulting in one or more altered video. The computer-implemented method also comprises compiling, by the processing and distribution system, the one or more altered video into a digital file comprising automatically-produced multimedia content. The computer-implemented method also comprises making, by the processing and distribution system, the digital file available for viewing. This computer program product provides an advantage over existing computer programs because it provides a faster and more efficient way of viewing video content recorded by multiple attendees that would be of interest to a viewer.

Further, services relating to one or more aspects are also described and may be claimed herein. In one optional embodiment, the at least two multimedia files may be received by the processing and distribution system contemporaneously. In another optional embodiment, the speckle excitement vector may include at least one data-sorting system for categorizing at least one aspect of the cognitive state of each of the at least two users with a measurement system, and where the at least one aspect may be represented by a measurable value. In another optional embodiment, the at least one identifying feature may include at least one of a gesture, sound, speech, and background sound feature. In another optional embodiment, the cognitive state of each of the at least two users may be determined in real-time. In one optional embodiment, the one or more altered video may parallel the cognitive state of each of the at least two users. In one optional embodiment, the processing and distribution system may sequence the one or more altered video into a playlist based on one or more selected criterion. In another optional embodiment, the selected criterion may include at least one of a theme, chronological sequence, location, and environment. In another optional embodiment, at least one viewer may access the digital file independently of one or more social media platforms. In another optional embodiment, the cognitive state may be based on at least one of an outcome of applying natural language understanding and biometric information of the at least two users. Each of these optional embodiments provide an advantage because they assist in providing a faster and more efficient way of viewing video content recorded by multiple attendees that would be of interest to a viewer.

Additional features are realized through the techniques set forth herein. Other embodiments and aspects, including but not limited to methods, a computer program product, and a system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
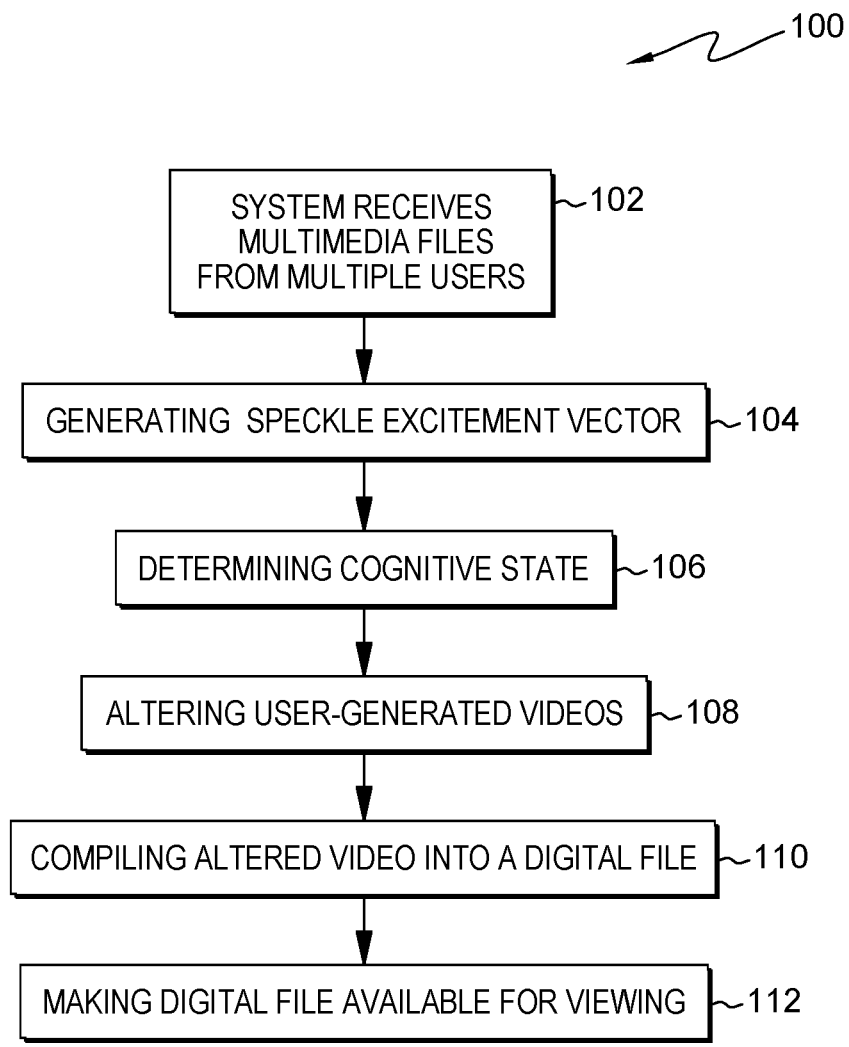
FIG. 1 is a flow diagram showing one example of a method for presenting video highlights, in accordance with one or more aspects of the present disclosure.

One or more aspects of this disclosure relate, in general, to presenting video highlights. More particularly, one or more aspects of this disclosure relate to generating a speckle excitement vector to be used in altering user-generated videos.

Disclosed herein, in accordance with one or more aspects of the present disclosure, is a method to present video highlights by generating a speckle excitement vector. The speckle excitement vector may be used to automate the curation of exciting, user-generated content and present user-generated content alongside video content traditionally-produced by organizers and others providing official video broadcasting of an event. By making user-generated content more accessible to viewers, users are enticed to watch more user-generated content, which may increase user dwell time on official digital channels and increase revenue from digital advertising. Advantages of this method that distinguish it from the prior art include, for example, generating a speckle excitement vector based on at least one identifying feature of at least one user-generated video, determining the cognitive state of multiple users of a processing and distribution system, altering user-generated video based on the cognitive state of each of the users, and compiling the altered video into a digital file that includes automatically-produced multimedia content.

As used herein, the term "Speckle Highlight" refers to a video highlight generated by a user with a camera. The user may select a background sound to include with the residual sound and speech of the generated highlight.

As used herein, the term "Speckle Excitement Vector" refers to a data structure of features extracted from a Speckle Highlight and weights assigned thereto. Using machine learning applied to input data of Speckle Highlight features and weights, over time the weights become predictors of an excitement level of the user. Applying numeric inputs to various layers in a neural network, and by transitioning from one layer of a neural network to another layer, matrices of weights are created thereby forming predictors.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable.

For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees Or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

FIG. 1 is a flow diagram 100 showing one example of a computer-implemented method for presenting video highlights, in accordance with one or more aspects of the present disclosure. The method begins with at least two users, each producing at least one multimedia file that includes a user-generated video. In one embodiment, the user-generated video includes a speckle highlight. The user-generated video is then enhanced by the user. For example, the user may enhance the video by adding a background sound. The user then shares the user-generated video with a processing and distribution system. The processing and distribution system may be used, according to one embodiment, to augment the experience of the users and the way in which the users are experiencing the world. The processing and distribution system receives 102 at least two multimedia files that each include user-generated video. The processing and distribution system also generates 104 a speckle excitement vector of each of the received multimedia files. In one embodiment, the speckle excitement vector may be based on at least one identifying feature of user-generated video. In various embodiments, the identifying feature may include gestures or movements, residual sound, speech, and background sound. In one embodiment, the speckle excitement vector may include various measures by which the excitement levels of user-generated videos may be compared. The processing and distribution system also determines 106 a cognitive state for each user based, in part, on the generated speckle excitement vector. The processing and distribution system alters 108 one or more characteristic of the user-generated video from the received multimedia files based on the determined cognitive state of each user, resulting in one or more altered video. For example, the cognitive state of each user may be determined by monitoring the user with one or more biometric device. The processing and distribution system compiles 110 the altered video into a digital file that includes automatically-produced multimedia content. For example, the user-generated video may be packaged into a playlist of highlight videos based on one or more selected criterion. In one embodiment, user-generated video may be compiled according to the determined speckle excitement vector, video style, and video subject matter. In another embodiment, the user-generated video may be compiled into an agglomeration that includes a speckle highlight in addition to video content traditionally-produced by organizers and others providing official video broadcasting of an event.

Figure 2:
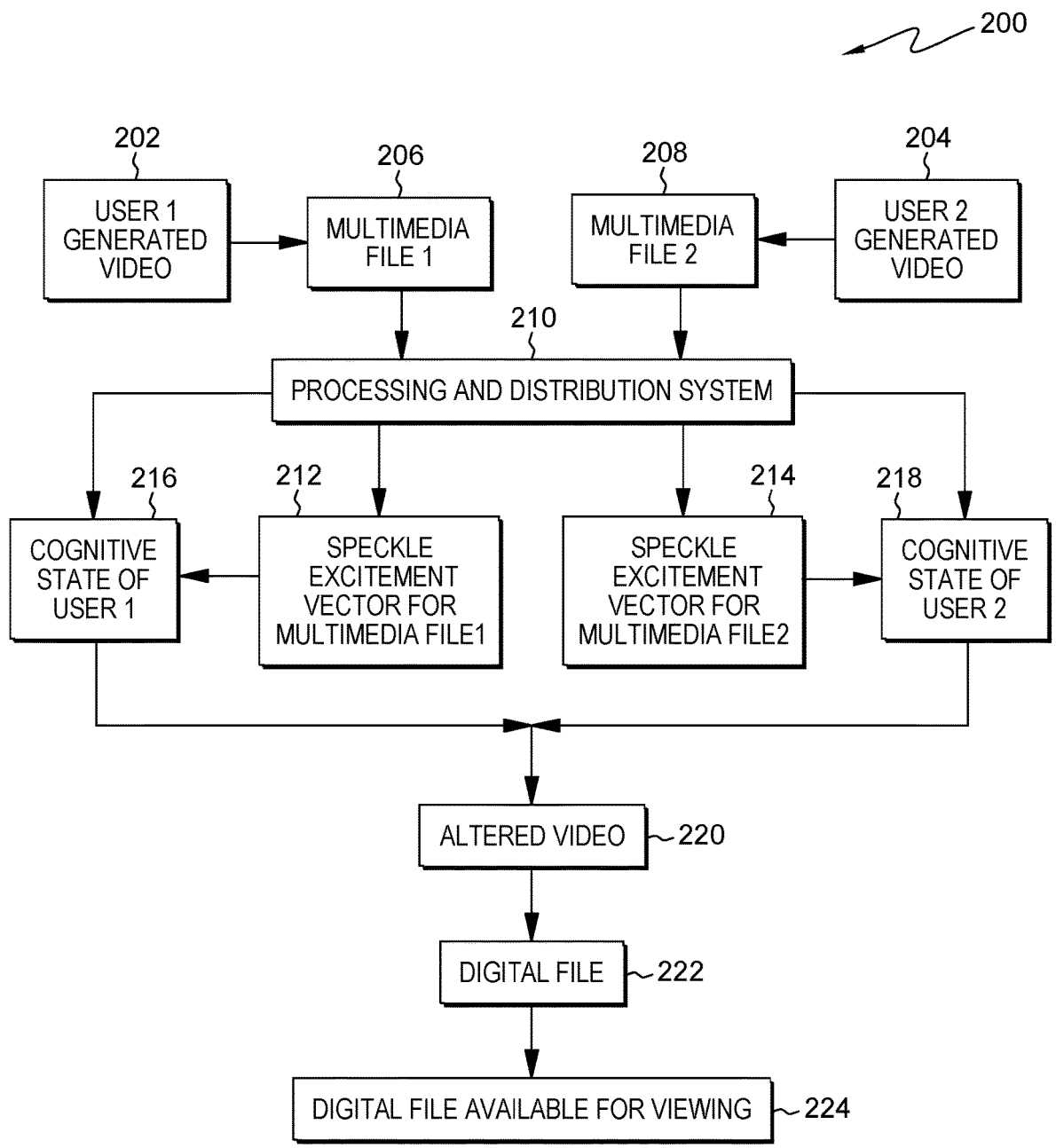
FIG. 2 is a simplified block diagram representing one example of a system for employing the method of FIG. 1 in accordance with one or more aspects of the present disclosure.

FIG. 2 is a simplified block diagram representing one example of a system 200 for employing the method of FIG. 1 in accordance with one or more aspects of the present disclosure. The system may include, for example, video 202 generated by user 1 that may include speckle highlights. Another video 204 may also be generated by user 2. For example, video 202 generated by user 1 and video 204 generated by user 2 may both include video taken of the same live event. User 1 may save their video 202 to multimedia file 1 206. Similarly, user 2 may save their video 204 to multimedia file 2 208. Both multimedia file 1 206 and multimedia file 2 208 may be shared with a processing and distribution system 210. In one embodiment, both multimedia file 1 206 and multimedia file 2 208 may be received by the processing and distribution system 210 contemporaneously. The processing and distribution system 210 may then analyze and assign weights to the user-1-generated video 202 and the user-2-generated video 204, the analysis being described in more detail subsequently. Based on various inputs described below, the processing and distribution system 210 may generate a speckle excitement vector 212 for multimedia file 1 and a speckle excitement vector 214 for multimedia file 2 208. The speckle excitement vector 212 for multimedia file 1 and speckle excitement vector 214 for multimedia file 2 may include the assigned weights resulting from the analysis performed by the processing and distribution system 210. The speckle excitement vector 212 for multimedia file 1 and speckle excitement vector 214 for multimedia file 2 may include a data structure of features including data extracted from the speckle highlight representing excitement levels of user-1-generated video 202 and user-2-generated video, respectively. The processing and distribution system 210 may determine the cognitive state 214 of user 1 and the cognitive state 216 of user 2. According to one embodiment, the speckle excitement vector 214 may include at least one data-sorting system for cognitively categorizing at least one aspect, which may be represented by measurable values, of the cognitive state for both user 1 and user 2. The determined excitement level of a user may be based, in part, on the speckle excitement vector 212 and speckle excitement vector 214, respectively. In one embodiment, the cognitive states for both user 1 and user 2 may be determined in real-time by the processing and distribution system 210 via biometric devices and natural language understanding (NLU) processing of text. The biometric and NLU information that may be used to determine the cognitive state of user 1 216 and the cognitive state of user 2 218 may be integrated into a video 220 by matching the information to stored measurements corresponding to average user biometric and NLU information. The processing and distribution system 210 may utilize predictors of an excitement level of the user within speckle excitement vector 212 and speckle excitement vector 214. Weights may become predictors over time by using machine learning applied to input data of speckle highlight features and weights. The stored measurements may be numeric inputs that have been applied to various layers in a neural network and have transitioned from one layer of the neural network to another layer to create at least one matrix of weights that may predict the cognitive state of the user. In one embodiment, the video 220 may include altered versions of user-1-generated video 202 and user-2-generated video 204. In one embodiment, the altered video 220 may parallel the current cognitive state for each user. In one embodiment, the altered video 220 may include highlights with changes to color, brightness, contrast, and sound. In another example, the altered video 220 may be sequenced in a meaningful way, such as thematically, chronologically, by location, and/or by other environmental factors. According to one embodiment, videos that may be determined to be preferred may be placed earlier in the sequence, whereas videos that may be determined not to be preferred may be placed later or excluded. For example, videos may be sequenced based on the number of views or the likelihood that a video will be more popular. The altered video 220 may also be compiled into a digital file 222, which may include automatically-produced multimedia content. A finalized digital file 224 may be made available for viewing.

Figure 3:
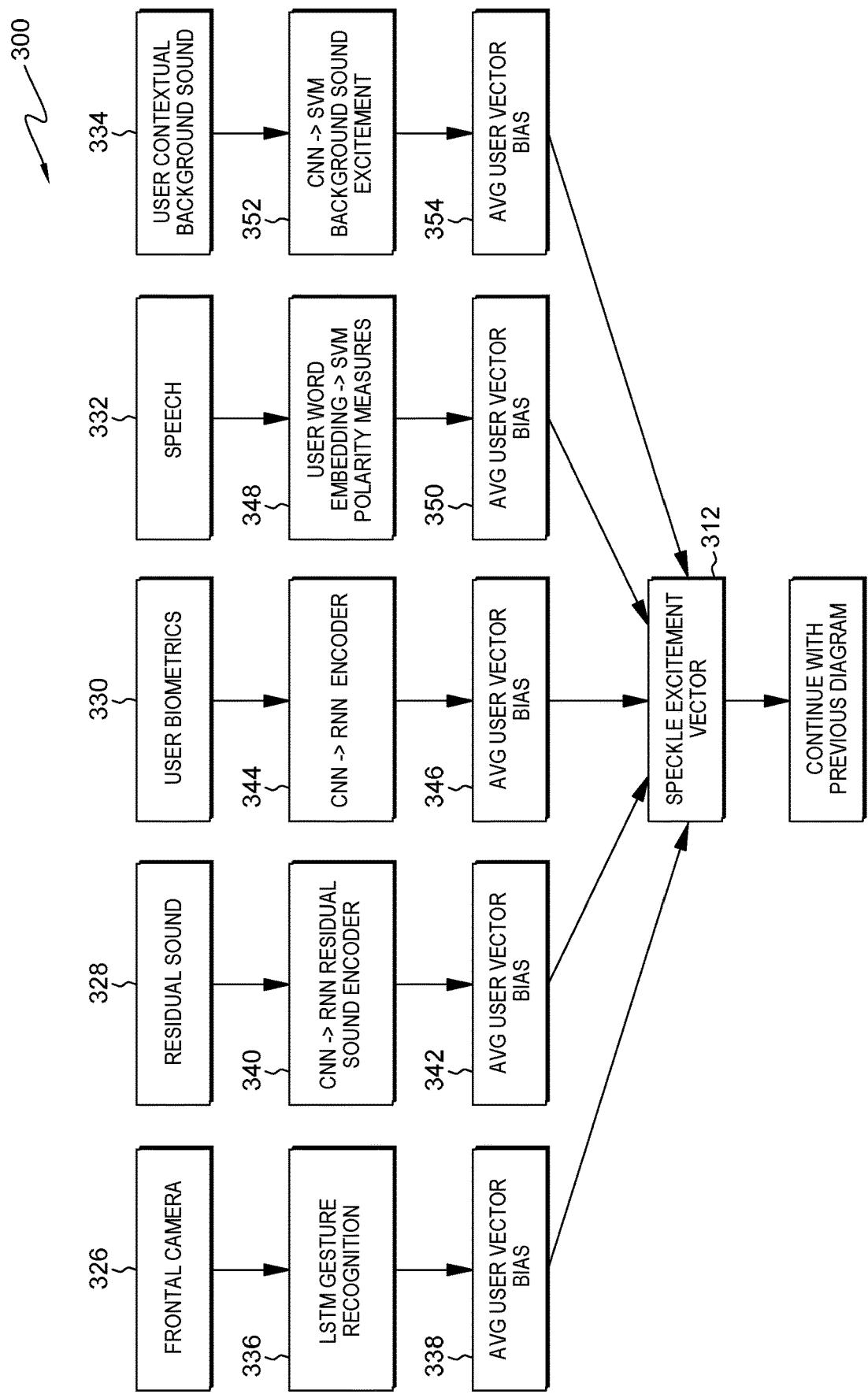
FIG. 3 is a block diagram of one example of generating the speckle excitement vector of FIG. 2, in accordance with one or more aspects of the present disclosure.

FIG. 3 is a block diagram 300 of one example of generating the speckle excitement vector 212 of FIG. 2, in accordance with one or more aspects of the present disclosure. The speckle excitement vector 312, according to one embodiment may be a vector that includes several saved measurements by which excitement levels of various inputs from videos may be compared. Inputs that may be received by the processing and distribution system may be converted to numerical values that may also be compared to the saved measurements. For example, aspects of user-generated videos may be recognized as one of five categories of inputs. The categories may include one or more input received by the frontal camera 326, one or more residual sound 328 input, one or more input of user biometrics 330, one or more speech 332 input, and/or one or more input of contextual background sound 334. The frontal camera 326 may provide one or more input with visual Tong-term and short term (LSTM) gesture recognition 336 where kinetic movements may be recognized. The LSTM gesture recognition 336 may also be converted to a numerical value and biased with a user-centered encoding vector 338 of kinetic movements of at least one average user. In one embodiment, the frontal camera 326 may convert one or more video input into image frames. Inputs categorized as residual sound 328 may be broken down by the compositional neural network (CNN) into a recurrent neural network (RNN) of numerical values via a residual sound encoder 340. The resulting numerical data may also be biased with a user-centered encoding vector 342 of residual sounds of one or more average user to classify the excitement level of the residual sound 328. Another category of inputs includes user biometrics 330, which may include biometric data from the user. Similar to the process for residual sound 328 inputs, the user biometrics 330 may be broken down by an encoder 344 from a CNN into a RNN of numerical values. The resulting numerical data may be biased with a user-centered encoding vector 346 of biometric data from one or more average user to classify the excitement level of user biometrics 330. For example, when a crowd is watching a highlight, the average of all biometric vectors from the crowd may be analyzed for similarities and used by the user-centered encoding vector 346 of biometric data to determine the delta between the average user and the numerical data received by the encoder 344. Inputs categorized as speech 332 may go through user word embedding via support vector machines 348 to create numerical values of the speech 332 inputs based on one or more polarity measures. The resulting numerical data may be biased with a user-centered encoding vector 350 of the speech of the average user. For example, the speech of the average user may include a specific user vocabulary to compare the numerical data produced by the support vector machines 348. Other inputs categorized as user contextual background sound 334 may be inputs of background sound that a user may have provided to give context to the video. Support vector machines 352 may break down the background sound 334 from a CNN to numerical values indicating a measure of background sound excitement. In one embodiment, the background sound 334 may be in the form of background text. For example, information based on NLU processing of text that a user may have posted on the Internet (e.g., Internet posts) and/or one or more social media platform (e.g., Tweets) may be used as background sound 334. In another embodiment, the background sound may include music that a user has incorporated into the video. The numerical values may be biased with a user-centered encoding vector 354 of the background sound of the average user. After the numerical values from each category have been biased, the resulting outputs may be agglomerated into the speckle excitement vector 312. The speckle excitement vector 312 may be utilized, according to one embodiment, in accordance with one or more aspects of the present disclosures. For example, the speckle excitement vector 312 may be utilized to determine the cognitive state of a user based on at least one outcome of applying NLU and biometric information of the user.

According to one embodiment, the processing and distribution system may utilize numerical values of the speckle excitement vector 312 representing excitement levels to classify speckle highlights into various categories. For example, in one embodiment the speckle excitement vector 312 may indicate high values for gesture recognition and low values for residual sound may indicate a "low-light"—a moment in which an individual captured by the user-generated video may have made a costly mistake in a sporting event. By referencing a history of videos previously watched by the user, the processing and distribution system may determine if this category of video is preferred by the user. The resulting determination may be used as part of the process for generating a sequence of videos or images in the form of an altered video comprising various highlights.

Figure 4:
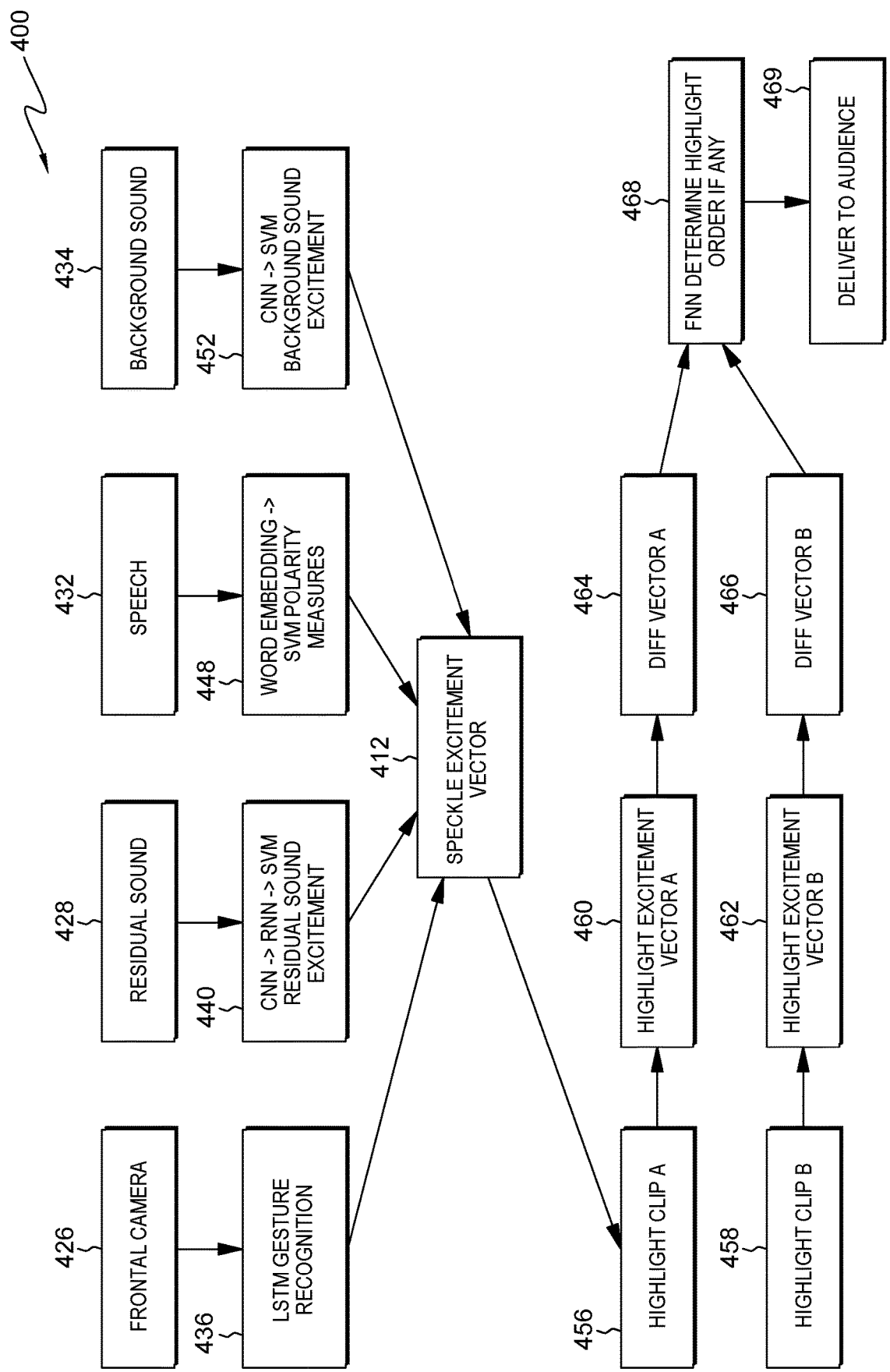
FIG. 4 is a block diagram of altering the user-generated video of FIG. 2, in accordance with one or more aspects of the present disclosure.

FIG. 4 is a block diagram 400 for altering the user-1-generated video 202 and user-2-generated video 204 of FIG. 2, in accordance with one or more aspects of the present disclosure. In one embodiment; various inputs may be converted to numerical values which may be biased with user-centered encoding vectors, as shown and described in FIG. 3. The resulting, outputs may be agglomerated into a speckle excitement vector 412. In one example, the speckle excitement vector 412 may be included in highlight clip A 456 and another speckle excitement vector (not shown) may be included in highlight Clip B 458. The numerical values provided by the speckle excitement vector 412 may be compared with numerical values of highlight excitement vector A 460, comprising automatically-produced multimedia content, to produce difference vector A 462. Difference vector A 462 may indicate the difference between the speckle excitement vector 412 and the highlight excitement vector A 460, The process may be repeated for highlight clip B 458. The numerical values of highlight excitement vector B 462, comprising other automatically-produced multimedia content, may be compared to numerical values of another speckle excitement vector (not shown), to produce difference vector B 464. Difference vector A 464 and difference vector B 466 may be processed by a feedforward neural network 468 (FNN) to determine the order of highlight videos to be delivered in the form of a digital file to be presented on a display and delivered to an audience 469. In one embodiment, the digital file may be made available, by the processing and distribution system, independently of one or more social media platforms.

Figure 5:
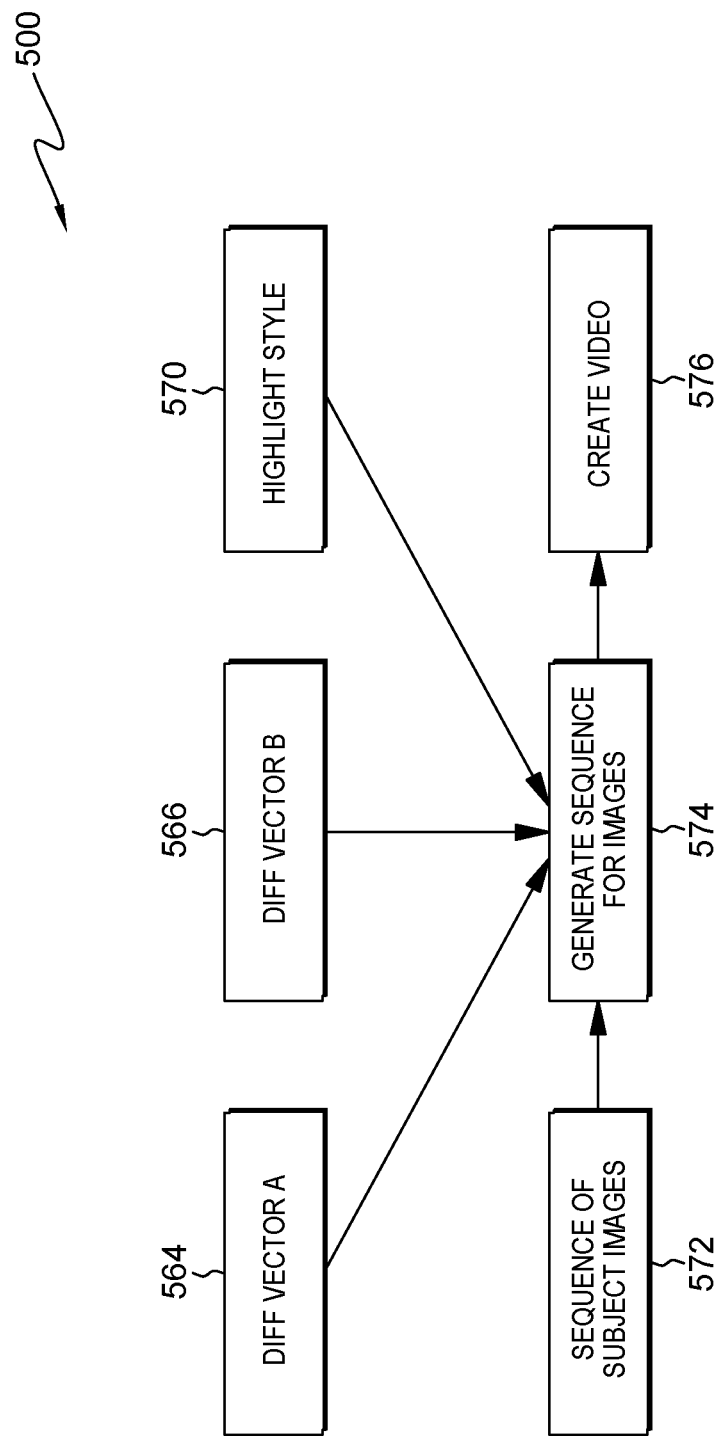
FIG. 5 is a block diagram of compiling the altered video of FIG. 2, in accordance with one or more aspects of the present disclosure.

FIG. 5 is a block diagram 500 for compiling the altered video 220 of FIG. 2. In one embodiment, difference vector A 564 and difference vector B 566 may be compiled with a particular highlight style 570, in accordance with one or more aspects of the present disclosure. An automatically-produced sequence of subject images 572 may be combined with difference vector A 564, difference vector B 566 and a given highlight style 570 to generate a sequence 574 of images. For example, the sequence of subject images 572 may include images of the same subject matter of the highlight video of difference vector A 564 and difference vector B 566. Videos that correspond to a designated highlight style 570 for the chosen subject may be sequenced to create a video 576. The video 576 may, according to one embodiment, benefit event organizers, as viewers of the video 576 will no longer need to leave official digital channels to seek user-generated content on social platforms. The video 576 may improve the experience of end users because the burden of searching for relevant content may be reduced.

Figure 6:
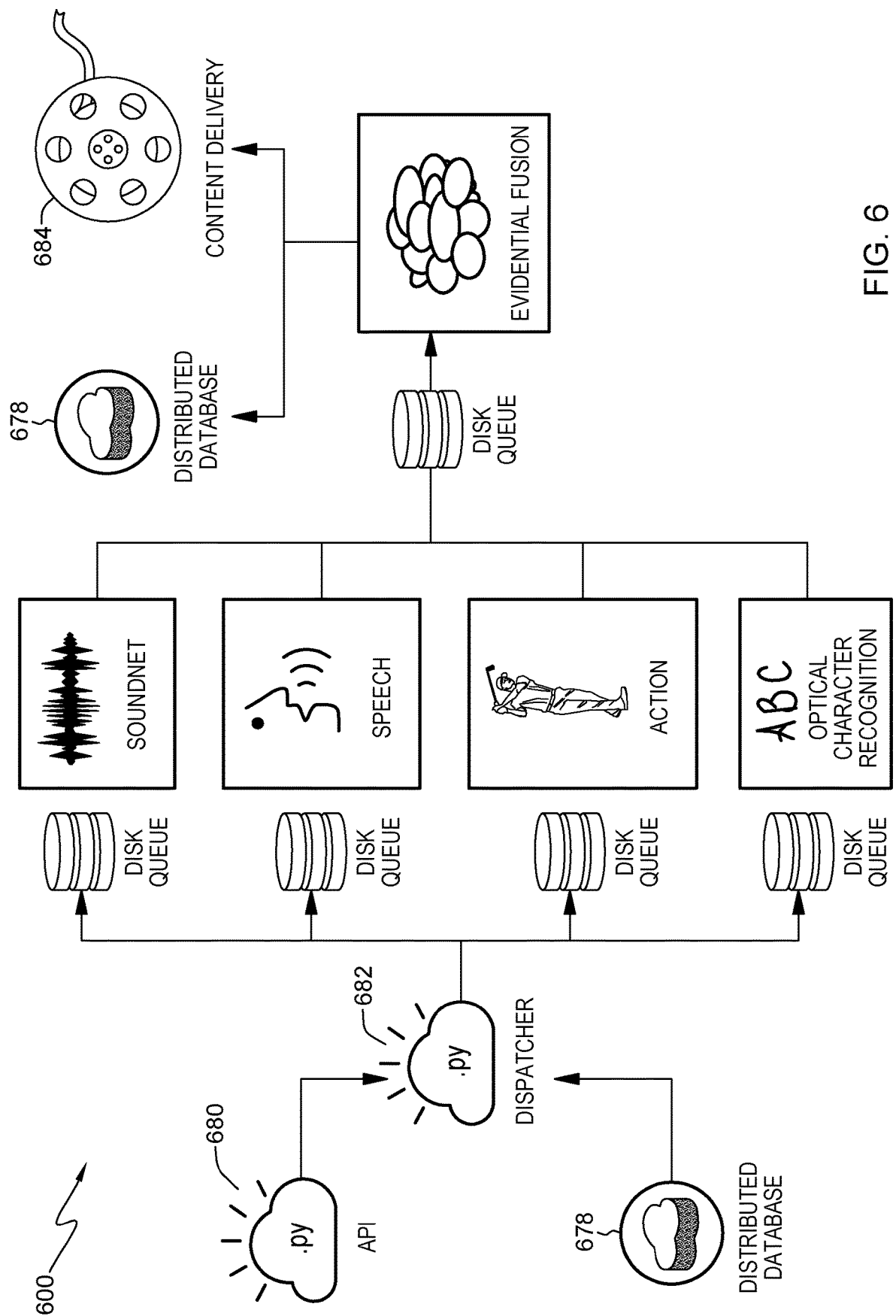
FIG. 6 is a schematic diagram of presenting video highlights, in accordance with one or more aspects of the present disclosure.

FIG. 6 is a schematic diagram 600 of presenting video highlights, in accordance with one or more aspects of the present disclosure. Data of existing event highlights may be stored in a storage medium such as, for example, a first-in first-out (FIFO) database 678. In one embodiment, a cloud application programming interface (API) 680 may serve as an interface for providing access to the storage medium. The storage medium may be readable by a processor and may include storing, instructions executable by the processor. Once the data are stored, the data may be provided to a cloud-based dispatch system 682. The cloud-based dispatch system 682 may transmit the data to various disk queues depending on how the data have been categorized. Video may also be sent to a processing and distribution system, where the video may be altered and transmitted to another disk queue prior to being compiled in the form of a digital file. The digital file may also be made available for viewing 684. For example, the digital file may include video highlights from a sporting event that may be displayed to viewers. The digital file may then be stored in the database 678 for future use.

Aspects of the present disclosure and certain features, advantages, and details thereof, are explained herein with reference to the non-limiting examples illustrated in the accompanying drawings. Descriptions of well-known materials, fabrication tools, processing techniques, etc., are omitted so as not to unnecessarily obscure aspects of the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Where used herein, terms in the form of "cognitive(ly) <function>" refer to the use of cognitive computing in performing the function. Cognitive computing is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

As used herein, the term "real-time" refers to a period of time necessary for data processing and presentation to a user to take place, and which is fast enough that a user does not perceive any significant delay. Thus, "real-time" is from the perspective of the user.

In a first aspect, disclosed is a computer-implemented method of presenting video highlights. In one embodiment, the computer-implemented method includes receiving, by a processing and distribution system, from at least two users, at least two multimedia files that each include at least one user-generated video, and where the at least two multimedia files are produced and enhanced by at least two users. The computer-implemented method also includes generating, by the processing and distribution system, a speckle excitement vector of each multimedia file based on at least one identifying feature of the user-generated video. The computer-implemented method also includes determining, by the processing and distribution system, a cognitive state of each of the users based, in part, on the speckle excitement vector of each of the multimedia files. The computer-implemented method also includes altering, by the processing and distribution system, one or more characteristic of the user-generated video of each of the multimedia files based on the cognitive state of the users, resulting in one or more altered video. The computer-implemented method also includes compiling, by the processing and distribution system, the altered video into a digital file that includes automatically-produced multimedia content. The computer-implemented method also includes making, by the processing and distribution system, the digital file available for viewing. This computer-implemented method of presenting video highlights provides an advantage over existing methods because it provides a faster and more efficient way of viewing video content recorded by multiple attendees that would be of interest to a viewer.

In the method of the first aspect, the processing and distribution system may optionally receive the multimedia files contemporaneously. In the method of the first aspect, the speckle excitement vector may optionally include at least one data-sorting system for cognitively categorizing at least one aspect of the cognitive state for each of the users within a measurement system and where the aspect may be represented by a measurable value. In the method of the first aspect, the identifying feature may optionally include at least one gesture, sound, speech, and background sound feature. In the method of the first aspect, the cognitive state of each of the users may optionally be determined in real-time. In the method of the first aspect, the altered video may optionally parallel the cognitive state for each of the users. The method of the first aspect may optionally include sequencing, by the processing and distribution system, the altered video into a playlist based on one or more selected criterion, and the one or more selected criterion may optionally include at least one theme, chronological sequence, location, and environment. The method of the first aspect may optionally include making available, by the processing and distribution system, the digital file independently of one or more social platforms. In the method of the first aspect, the cognitive state may optionally be based on at least one outcome of applying natural language understanding and biometric information of the users. Each of these optional embodiments provide an advantage because they assist in providing a faster and more efficient way of viewing video content recorded by multiple attendees that would be of interest to a viewer.

In second aspect, disclosed is a system for presenting video highlights. The system may include, for example, memory(ies), and at least one processor in communication with the memory(ies). The memory(ies) include program instructions executable by the one or more processor to perform a method. In one embodiment, the computer-implemented method includes receiving, by a processing and distribution system, from at least two users, at least two multimedia files that each include at least one user-generated video, and where the at least two multimedia files are produced and enhanced by at least two users. The computer-implemented method also includes generating, by the processing and distribution system, a speckle excitement vector of each multimedia file based on at least one identifying feature of the user-generated video. The computer-implemented method also includes determining, by the processing and distribution system, a cognitive state of each of the users based, in part, on the speckle excitement vector of each of the multimedia files. The computer-implemented method also includes altering, by the processing and distribution system, one or more characteristic of the user-generated video of each of the multimedia files based on the cognitive state of the users, resulting in one or more altered video. The computer-implemented method also includes compiling, by the processing and distribution system, the altered video into a digital file that includes automatically-produced multimedia content. The computer-implemented method also includes making, by the processing and distribution system, the digital file available for viewing. This system for presenting video highlights provides an advantage over existing systems because it provides a faster and more efficient way of viewing video content recorded by multiple attendees that would be of interest to a viewer.

In the method of the second aspect, the cognitive state may optionally be based on at least one outcome of applying natural language understanding and biometric information of the users. In the method of the second aspect, the speckle excitement vector may optionally include at least one data-sorting system for cognitively categorizing at least one aspect of the cognitive state for each of the users within a measurement system and where the aspect is represented by a measurable value. In the method of the second aspect, the identifying feature may optionally include at least one gesture, sound, speech, and background sound feature. In the method of the second aspect, the cognitive state of each of the users may optionally be determined in real-time.

In a third aspect, a computer program product may be provided. The computer program product may include a storage medium readable by a processor and storing instructions executable by the processor for performing a method. In one embodiment, the computer-implemented method includes receiving, by a processing and distribution system, from at least two users, at least two multimedia files that each include at least one user-generated video, and where the at least two multimedia files are produced and enhanced by at least two users. The computer-implemented method also includes generating, by the processing and distribution system, a speckle excitement vector of each multimedia file based on at least one identifying feature of the user-generated video. The computer-implemented method also includes determining, by the processing and distribution system, a cognitive state of each of the users based, in part, on the speckle excitement vector of each of the multimedia files. The computer-implemented method also includes altering, by the processing and distribution system, one or more characteristic of the user-generated video of each of the multimedia files based on the cognitive state of the users, resulting in one or more altered video. The computer-implemented method also includes compiling, by the processing and distribution system, the altered video into a digital file that includes automatically-produced multimedia content. The computer-implemented method also includes making, by the processing and distribution system, the digital file available for viewing. This computer program product provides an advantage over existing computer programs because it provides a faster and more efficient way of viewing video content recorded by multiple attendees that would be of interest to a viewer.

In the method of the third aspect, the cognitive state may optionally be based on at least one outcome of applying natural language understanding and biometric information of the users. In the method of the third aspect, the speckle excitement vector may optionally include at least one data-sorting system for cognitively categorizing at least one aspect of the cognitive state for each of the users within a measurement system and where the aspect is represented by a measurable value. In the method of the third aspect, the identifying feature may optionally include at least one gesture, sound, speech, and background sound feature. In the method of the third aspect, the cognitive state of each of the users may optionally be determined in real-time.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes, the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing, infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other environments may incorporate and use one or more aspects of the present disclosure. Further, other events may be monitored and/or other actions may be taken in response to the events. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

Certain embodiments herein may offer various technical computing advantages involving computing advantages to address problems arising in the realm of computer networks. Particularly, computer networks operating to present video highlights. Embodiments herein can include a processing and distribution system that receives a multimedia file of user-generated video recorded by multiple users. Embodiments herein can include a processing and distribution system that generates a speckle excitement vector for each multimedia file received. Provided herein, according to one embodiment, are processes that determine a cognitive state of a user based, in part, on a speckle excitement vector generated by the processing and distribution system, Embodiments herein alter one or more characteristic of user-generated video based on the cognitive state of the user. Embodiments herein produce altered video that is compiled into a digital file that includes automatically-produced multimedia content. Embodiments herein make the digital file of altered video and automatically-produced multimedia content available for viewing. Various decision data structures can be used to drive artificial intelligence (AI) decision making, such as decision data structure that categorizes excitement levels of videos generated by users. Decision data structures as set forth herein can be updated by machine learning so that accuracy and reliability is iteratively improved over time without resource consuming rules intensive, processing, Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process video generated by users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

The umbrella term "Natural Language Understanding" can be applied to a diverse set of computer applications, ranging from small, relatively simple tasks such as, for example, short commands issued to robots, to highly complex endeavors such as, for example, the full comprehension of newspaper articles or poetry passages. Many real world applications fall between the two extremes, for example, text classification for the automatic analysis of emails and their routing to a suitable department in a corporation does not require in-depth understanding of the text, but it does need to work with a much larger vocabulary and more diverse syntax than the management of simple queries to database tables with fixed schemata.

Regardless of the approach used, most natural language understanding systems share some common components. The system needs a lexicon of the language and a parser and grammar rules to break sentences into an internal representation. The construction of a rich lexicon with a suitable ontology requires significant effort, for example, the WORDNET lexicon required many person-years of effort. WORDNET is a large lexical database of English. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated, for example, with a browser specially configured to provide the navigation functionality. WORDNET's structure makes it a useful tool for computational linguistics and natural language processing.

WORDNET superficially resembles a thesaurus, in that it groups words together based on their meanings. However, there are some important distinctions. First, WORDNET interlinks not just word forms—strings of letters—but specific senses of words. As a result, words that are found in close proximity to one another in the network are semantically disambiguated. Second, WORDNET labels the semantic relations among words, whereas the groupings of words in a thesaurus does not follow any explicit pattern other than meaning similarity.

The system also needs a semantic theory to guide the comprehension. The interpretation capabilities of a language understanding system depend on the semantic theory it uses. Competing semantic theories of language have specific trade-offs in their suitability as the basis of computer-automated semantic interpretation. These range from naive semantics or stochastic semantic analysis to the use of pragmatics to derive meaning from context.

Advanced applications of natural language understanding also attempt to incorporate logical inference within their framework. This is generally achieved by mapping the derived meaning into a set of assertions in predicate logic, then using logical deduction to arrive at conclusions. Therefore, systems based on functional languages such as the Lisp programming language need to include a subsystem to represent logical assertions, while logic-oriented systems such as those using the language Prolog, also a programming language, generally rely on an extension of the built-in logical representation framework.

A Natural Language Classifier, which could be a service, for example, applies cognitive computing techniques to return best matching predefined classes for short text inputs, such as a sentence or phrase. It has the ability to classify phrases that are expressed in natural language into categories. Natural Language Classifiers ("NLCs") are based on Natural Language Understanding (NLU) technology (previously known as "Natural Language Processing"). NLU is a field of computer science, artificial intelligence (AI) and computational linguistics concerned with the interactions between computers and human (natural) languages.

For example, consider the following questions: "When can you meet me?" or When are you free?" or "Can you meet me at 2:00 PM?" or "Are you busy this afternoon?" NLC can determine that they are all ways of asking about "setting up an appointment." Short phrases can be found in online discussion forums, emails, social media feeds, SMS messages, and electronic forms. Using, for example, APIs (Application Programming Interface), one can send text from these sources to a natural language classifier trained using machine learning techniques. The classifier will return its prediction of a class that best captures what is being expressed in that text. Based on the predicted class one can trigger an application to take the appropriate action such as providing an answer to a question, suggest a relevant product based on expressed interest or forward the text to an appropriate human expert who can help.

Applications of such APIs include, for example, classifying email as SPAM or No-SPAM based on the subject line and email body; creating question and answer (Q&A) applications for a particular industry or domain; classifying news content following some specific classification such as business, entertainment, politics, sports, and so on; categorizing volumes of written content; categorizing music albums following some criteria such as genre, singer, and so on; combining a Natural Language Classifier service with a Conversation service if one wants their application to engage in a conversation with a user; and classifying frequently asked questions (FAQs).

Figure 7:
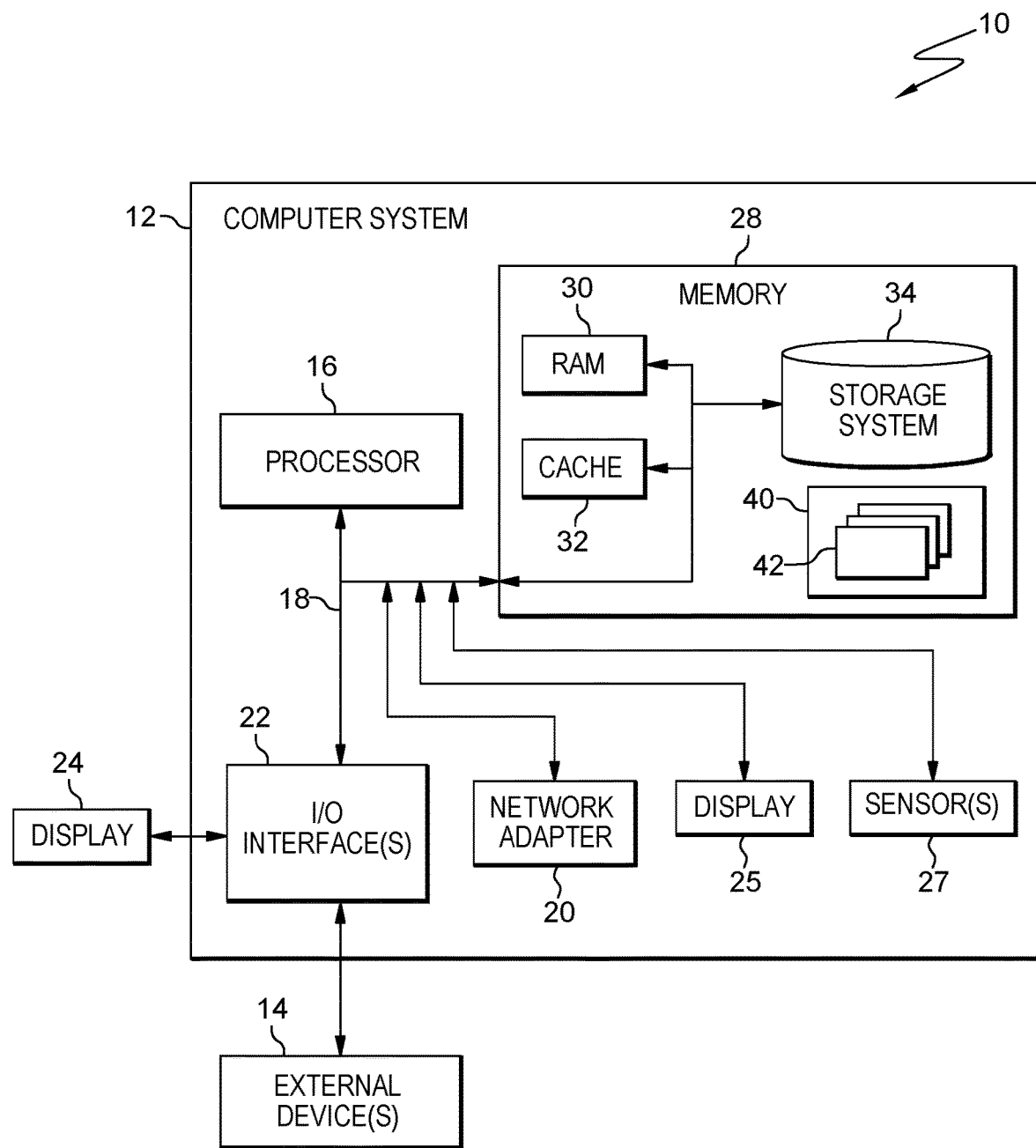
FIG. 7 is a block diagram of one example of a computer system, in accordance with one or more aspects of the present disclosure.
Figure 8:
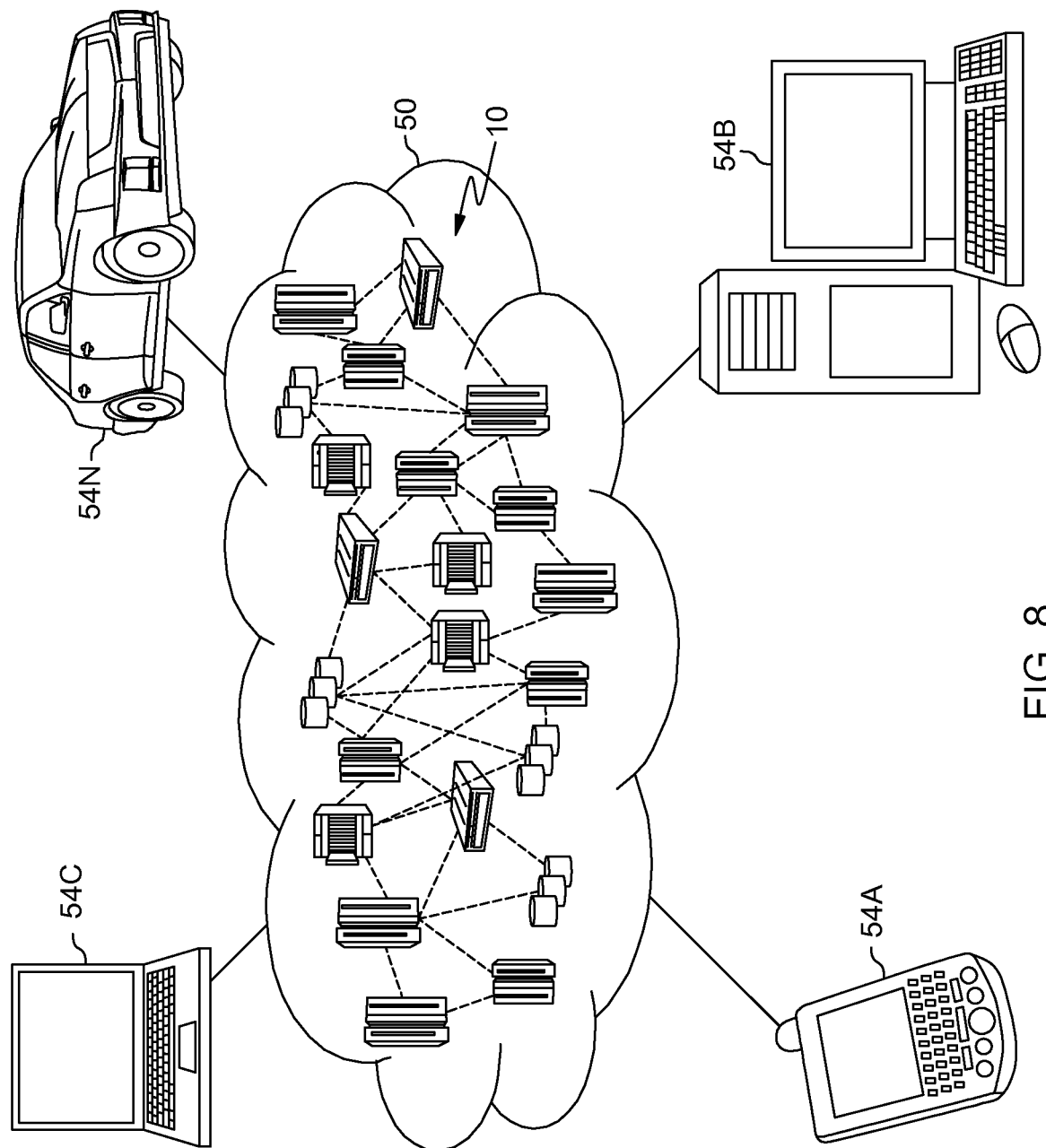
FIG. 8 is a block diagram of one example of a cloud computing environment, in accordance with one or more aspects of the present disclosure.
Figure 9:
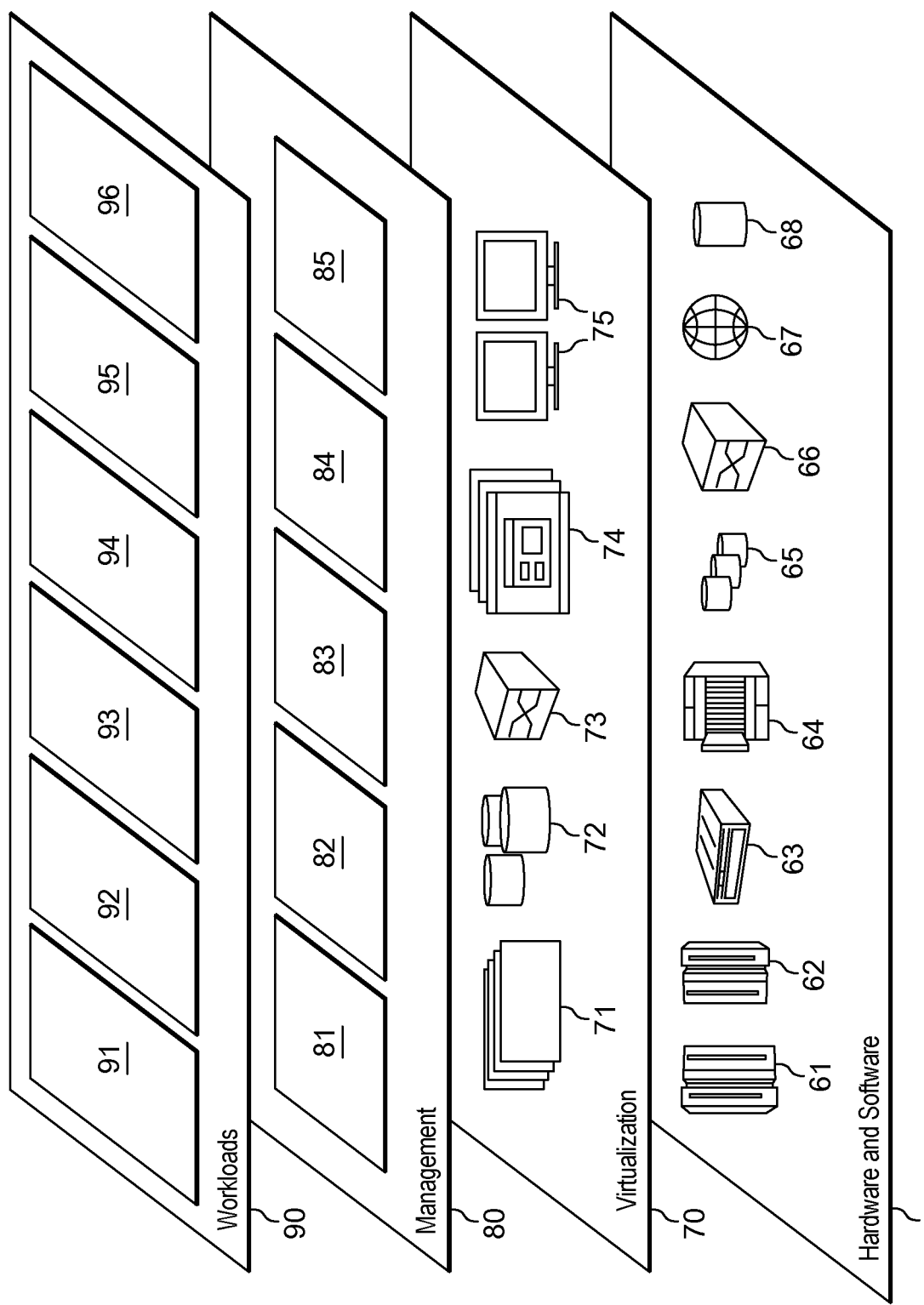
FIG. 9 is a block diagram of one example of functional abstraction layers of the cloud computing environment of FIG. 8, in accordance with one or more aspects of the present disclosure.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand, There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to, quickly scale out and rapidly released to quickly scale in, To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications; and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown, in the form of a computing device. The components of computer system. 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described with reference to method 100 of FIG. 1. And functions described with reference to system 200 as set forth in the flowchart of FIG. 2.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/

Output (I/O) interfaces 22. Still yet, computer system 12 can communicate with one or more networks such as a local area network (LAN), a general wide area network (WAN), and/or a public network (e.g., the Internet) via network adapter 20, As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 7.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM) a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"). "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method of presenting video highlights, the computer-implemented method comprising:
   receiving, by a processing and distribution system, from at least two users, at least two multimedia files each comprising at least one user-generated video, and wherein the at least two multimedia files are produced and enhanced by the at least two users;
   generating, by the processing and distribution system, a speckle excitement vector of each of the at least two multimedia files based on at least one identifying feature of the at least one user-generated video;
   determining, by the processing and distribution system, a cognitive state of each of the at least two users based, in part, on the speckle excitement vector of each of the at least two multimedia files, wherein the speckle excitement vector comprises at least one data-sorting system for cognitively categorizing at least one aspect of the cognitive state of each of the at least two users within a measurement system, wherein the at least one aspect is represented by a measurable value;
   altering, by the processing and distribution system, one or more characteristic of the at least one user-generated video of each of the at least two multimedia files based on the cognitive state of the at least two users, resulting in one or more altered video;
   compiling, by the processing and distribution system, the one or more altered video into a digital file comprising automatically-produced multimedia content; and
   making, by the processing and distribution system, the digital file available for viewing.

2. The computer-implemented method of claim 1, wherein the at least two multimedia files are received by the processing and distribution system contemporaneously.

3. The computer-implemented method of claim 1, wherein the at least one identifying feature comprises one or more of the following selected from the group consisting of a gesture, sound, speech, and background sound feature.

4. The computer-implemented method of claim 1, wherein the cognitive state of each of the at least two users is determined in real-time.

5. The computer-implemented method of claim 1, wherein the one or more altered video parallels the cognitive state of each of the at least two users.

6. The computer-implemented method of claim 1, further comprising sequencing, by the processing and distribution system, the one or more altered video into a playlist based on one or more selected criterion.

7. The computer-implemented method of claim 6, wherein the one or more selected criterion comprises one or more of the following selected from the group consisting of a theme, chronological sequence, location, and environment.

8. The computer-implemented method of claim 1, further comprising making available, by the processing and distribution system, the digital file independently of one or more social media platforms.

9. The computer-implemented method of claim 1, wherein the cognitive state is based on one or more of the folloeing selected from the group consisting of an outcome of applying natural language understanding and biometric information of the at least two users.

10. A system for presenting video highlights, the system comprising:
    a memory; and
    at least one processor in communication with the memory, the memory storing program code executable by the at least one processor to perform a method, the method comprising:
       receiving, by a processing and distribution system, from at least two users, at least two multimedia files each comprising at least one user-generated video, and wherein the at least two multimedia files are produced and enhanced by the at least two users;
       generating, by the processing and distribution system, a speckle excitement vector of each of the at least two multimedia files based on at least one identifying feature of the at least one user-generated video;
       determining, by the processing and distribution system, a cognitive state of each of the at least two users based, in part, on the speckle excitement vector of each of the at least two multimedia files, wherein the speckle excitement vector comprises at least one data-sorting system for cognitively categorizing at least one aspect of the cognitive state of each of the at least two users within a measurement system, wherein the at least one aspect is represented by a measurable value;
       altering, by the processing and distribution system, one or more characteristic of the at least one user-generated video of each of the at least two multimedia files based on the cognitive state of the at least two users, resulting in one or more altered video;
       compiling, by the processing and distribution system, the one or more altered video into a digital file comprising automatically-produced multimedia content; and
       making, by the processing and distribution system, the digital file available for viewing.

11. The system of claim 10, wherein the cognitive state is based on one or more of the following selected from the group consisting of an outcome of applying natural language understanding and biometric information of the at least two users.

12. The system of claim 10, wherein the at least one identifying feature comprises one or more of the following selected from the group consisting of a gesture, sound, speech, and background sound feature.

13. The system of claim 10, wherein the cognitive state for each of the at least two users is determined in real-time.

14. A computer program product for presenting video highlights, the computer program product comprising:
    a storage medium readable by a processor and storing instructions executable by the processor for performing a method of presenting video highlights, the method comprising:
       receiving, by a processing and distribution system, from at least two users, at least two multimedia files each comprising at least one user-generated video, and wherein the at least two multimedia files are produced and enhanced by the at least two users;
       generating, by the processing and distribution system, a speckle excitement vector of each of the at least two multimedia files based on at least one identifying feature of the at least one user-generated video;

determining, by the processing and distribution system, a cognitive state of each of the at least two users based, in part, on the speckle excitement vector of each of the at least two multimedia files, wherein the speckle excitement vector comprises at least one data-sorting system for cognitively categorizing at least one aspect of the cognitive state of each of the at least two users within a measurement system, wherein the at least one aspect is represented by a measurable value;

altering, by the processing and distribution system, one or more characteristic of the at least one user-generated video of each of the at least two multimedia files based on the cognitive state of the at least two users, resulting in one or more altered video;

compiling, by the processing and distribution system, the one or more altered video into a digital file comprising automatically-produced multimedia content; and making, by the processing and distribution system, the digital file available for viewing.

15. The computer program product of claim 14, wherein the cognitive state is based on one or more of the following selected from the group consisting of an outcome of applying natural language understanding and biometric information of the at least two users.

16. The computer program product of claim 14, wherein the at least one identifying feature comprises one or more of the following selected from the group consisting of a gesture, sound, speech, and background sound feature.

17. The computer program product of claim 14, wherein the cognitive state for each of the at least two users is determined in real-time.

18. The system of claim 10, further comprising sequencing, by the processing and distribution system, the one or more altered video into a playlist based on one or more selected criterion.

19. The system of claim 18, wherein the one or more selected criterion comprises one or more of the following selected from the group consisting of a theme, chronological sequence, location, and environment.

20. The computer program product of claim 14, further comprising sequencing, by the processing and distribution system, the one or more altered video into a playlist based on one or more selected criterion.

* * * * *